June 6, 1939.  H. LINDSAY  2,161,259
HOOK ADAPTER
Filed March 28, 1938
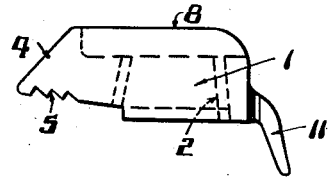
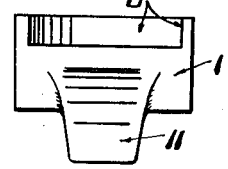
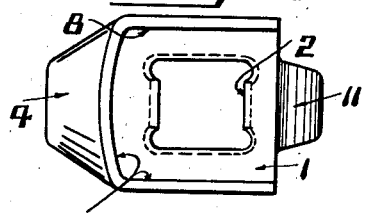
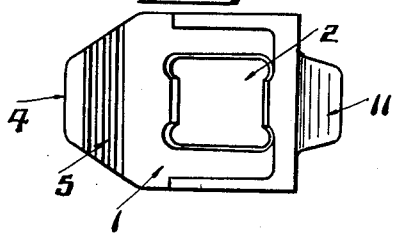
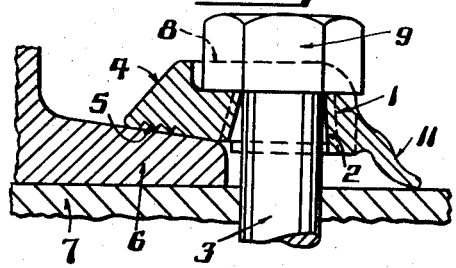
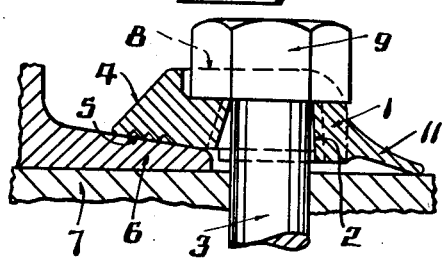
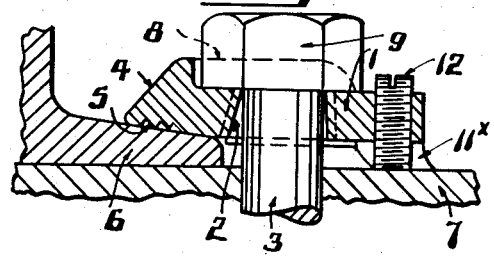
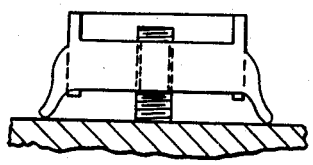
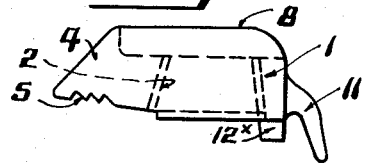
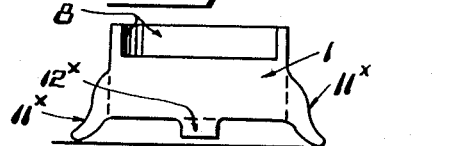
Inventor.
Henry Lindsay.
Attorneys Patented June 6, 1939

2,161,259

UNITED STATES PATENT OFFICE 2,161,259

HOOK ADAPTER

Henry Lindsay, Bradford, England, assignor to Henry Lindsay Limited, Bradford, England Application March 28, 1938, Serial No. 198,564
In Great Britain July 14, 1937

7 Claims. (Cl. 189—35)

This invention relates to hook adapters for bolts applicable also for clamping girders and the like together and has for its chief object to improve the construction of hook adapters as set forth in the specifications of my British Patent Nos. 411,400 and 461,953.

According to the present invention the hook adapter is provided with one or more spurs in lieu of or in addition to the rigid depending projection or abutment which spurs are adapted to bend on pressure being applied to the securing nut when that portion of the adapter comes into engagement with or grips the work in connection with which the hook adapted is used.

In order that the invention may be clearly understood and readily carried into effect, the same will now be more fully described with reference to and by the aid of the embodiments illustrated in the accompanying drawing; wherein:

Figures 1, 2, 3 and 4 are respectively a side elevation, rear end elevation, plan and an inverted plan of a hook adapter having a resilient or bendable spur at its rear end in lieu of a rigid bolt-engaging abutment.

Figures 5 and 6 are sectional elevations illustrating the application of the hook adapter shown in Figures 1 to 4 inclusive to the securing of flanged members of different thicknesses to a base or plate.

Figures 7 and 8 illustrate a modification in which the hook adapter has lateral spurs and an adjustable abutment in the form of a set screw.

Figures 9 and 10 are respectively a side elevation and a rear elevation of a hook adapter having a spur or spurs together with a rigid depending abutment.

Referring to Figures 1 to 6 inclusive of the drawing, the hook adapter or clamp for a bolt comprises a thick metal washer-like member 1 having a rectangular hole at 2 to take the bolt 3, with either a round or a square neck, and a forwardly extending hook portion 4 which is transversely serrated or ridged at 5 on its underside to engage and grip the flange 6 of the member which is to be clamped to the bed or plate member 7 through which the bolt passes. The upper face of the hook adapter is recessed to afford on three sides an upstanding wall 8 within which the bolt head 9 is accommodated so as to be prevented from turning relatively to the hook adapter. This recess may be omitted from the design or else it may be filled with a deep washer for cases where a nut comes against the adapter or where the head of bolt or screw must be allowed to turn.

The hook adapter is formed at its rear end with a depending spur 11 of a resilient or bendable nature and of such a length to enable the hook adapter to be employed for holding or clamping flanges 6 or articles which vary in thickness, said spur 11 bending as the nut on the bolt is screwed or tightened fully into position, so as to afford support on the side remote from the hook portion 4 and thereby ensure a firmer and secure locking of the hook adapter in position. The spur 11 is preferably of thinner material than the body of the adapter or clamp 1 and engages the bed or plate 7, so that when the parts are being applied, it is bent to constitute a support for the side of the clamp opposite the projection 4. The resistance set up by the resilient spur 11 thus serves to resist any tendency of the nut to unscrew should the work or bolt in connection with which the hook adapter is used be subjected to vibration.

In the modifications illustrated in Figures 7, 8 and 10 the hook adapter 1 is formed near its rear end with oppositely directed lateral spurs $11^x$, one on each side, and in the construction shown in Figures 7 and 8 the hook adapter 1 is provided in its rear end, between the spurs $11^x$ with a set screw 12 which when the bolt has been tightened up, can be adjusted to engage or bear upon the surface of the bed or plate 7 through which the bolt passes. As an alternative one or other of the resilient spurs 11 or $11^x$ may be adapted to receive a set screw or the like to afford a rigid abutment when the bolt has been tightened up to deflect or bend the spur or spurs.

In the Figure 10 embodiment, the rear end of the hook adapter 1 is formed between the spurs $11^x$ with a depending rigid abutment or solid heel portion $12^x$ to take the final pressure when the side spurs $11^x$ have been spread or bent under pressure.

In Figure 9 the hook adapter 1 is formed with a rearwardly extending spur 11 in conjunction with a solid heel portion $12^x$ which may or may not have a set-screw fitted thereto.

In forming a connection between two members say a girder and a plate, where it is desirable for the hook end of the adapter or clip to be adjustable to suit variations in the slope of the girder or rail, the adapter or clip may be provided with a deflectable spur or spurs at the front and/or sides in addition to the one at the rear or back. In this way the clip becomes universally adaptable without tilting the surface on which the head or nut of the bolt rests.

With hook adapters made according to the present invention the varying thicknesses of girder flanges and the like may be provided for and a greater security and efficiency in use of the hook adapter is thereby ensured.

I am aware it has been proposed to employ spring steel clamping plates below the nuts or anchoring bolts for securing rails to sleepers or bed plates, said clamping plates being curved to give a resilient grip upon the parts engaged.

I claim:

1. In combination with two members, fastening means for firmly securing the members together, said means including a clamp having a rigid projection on one side for engaging one of said members and a depending flexible spur on the side opposite to said projection for engaging the other of said members, said spur being of thinner material than the body of the clamp, said clamp and the spur engaging member having registering openings, and a threaded bolt extending through said openings and having an enlarged head arranged to engage the clamp when a nut is threaded to the free end of the bolt, said spur when the bolt is being applied to the members being bent to provide a support for the side of the clamp opposite the rigid projection.

2. In combination with two members of varying thickness, fastening means for firmly securing the members together, said means including a clamp having a rigid projection on one side for engaging one of said members and a depending flexible spur on the side opposite to said projection for engaging the other of said members, said spur being of thinner material than the body of the clamp, said clamp and the spur engaging member having registering openings, and a threaded bolt extending through said openings and having an enlarged head arranged to engage the clamp when a nut is threaded to the free end of the bolt, said spur when the bolt is being applied to the members being bent to constitute a support for the side of the clamp opposite the rigid projection and also acting to maintain the clamp in tight frictional contact with the underside of the head of the bolt to prevent the removal of the latter from the members.

3. In combination with two members, fastening means for firmly securing the members together, said means including a clamp having a rigid projection on one side for engaging one of said members and a pair of spaced oppositely extending lateral depending flexible spurs on the side opposite to said projection for engaging the other of said members, said spurs being of thinner material than the body of the clamp, said clamp and the spur engaging member having registering openings, and a threaded bolt extending through said openings, and having an enlarged head arranged to engage the clamp when a nut is threaded to the free end of the bolt, said spurs when the bolt is being applied to the members being bent to provide a support for the side of the adapter remote from the rigid projection.

4. In combination with two members, fastening means for firmly securing the members together, said means including a clamp having a rigid projection on one side for engaging one of said members and a pair of spaced oppositely extending lateral depending flexible spurs on the side opposite to said projection for engaging the other of said members, said clamp and the spur engaging member having registering openings, and a threaded bolt extending through said openings and having an enlarged head arranged to engage the clamp when a nut is threaded to the free end of the bolt, said clamp having an abutment between said flexible spurs, said abutment normally being spaced from the spur engaging member and arranged to be brought in contact with the spur engaging member when the bolt is fully applied to the members so as to constitute a stop for taking up the final pressure exerted by the nut.

5. In combination with two members, fastening means for firmly securing the members together, said means including a clamp having a rigid projection on one side for engaging one of said members and a pair of spaced oppositely extending lateral depending flexible spurs on the side opposite to said projection for engaging the other of said members, said clamp and the spur engaging member having registering openings, and a threaded bolt extending through said openings and having an enlarged head arranged to engage the clamp when a nut is threaded to the free end of the bolt, said clamp having an adjustable abutment between said flexible spurs, said abutment normally being spaced from the spur engaging member and arranged to be brought in contact with the spur engaging member when the bolt is fully applied to the members so as to constitute a stop for taking up the final pressure exerted by the nut.

6. In combination with two clamping members of varying thickness, fastening means firmly securing the members together, said means including a clamp having a rigid projection on one side for engaging one of said members and a depending flexible spur on the side opposite to said projection for engaging the other of said members, said spur being of thinner material than the body of the clamp, said clamp and the spur engaging member having registering openings, and a threaded bolt extending through said openings and having an enlarged head arranged to engage the clamp when a nut is threaded to the free end of the bolt, said clamp having a polygonal-shaped recess in the top thereof arranged to receive the head of the bolt, said spur when the nut is being fully applied to the bolt being bent to constitue a resilient support for the side of the clamp opposite the rigid projection and also acting to maintain the clamp in tight frictional contact with the underside of the head of the bolt to prevent the removal of the latter from the members.

7. In combination with two members, fastening means for firmly securing the members together, said means including a clamp having a rigid projection on one side for engaging one of said members and a depending flexible spur on the side opposite to said projection for engaging the other of said members, said spur being of thinner material than the body of the clamp and arranged to bear against the surface of the spur engaging member, and means for securing the clamp to said members, said spur when the clamp is being applied to said members bearing against the spur engaging member to provide a support for the side of the clamp opposite the rigid projection.

HENRY LINDSAY.